United States Patent
Nilsson

(12) 
(10) Patent No.: US 6,292,675 B1
(45) Date of Patent: Sep. 18, 2001

(54) WIRELESS MOBILE TELEPHONE SYSTEM WITH VOICE-DIALING TELEPHONE INSTRUMENTS AND DTMF CAPABILITY

(76) Inventor: Byard G. Nilsson, 2064 Santa Margarita Dr., Fallbrook, CA (US) 92028

( * ) Notice: Subject to any disclaimer, the term of this patent is extended or adjusted under 35 U.S.C. 154(b) by 0 days.

(21) Appl. No.: 09/311,795

(22) Filed: May 13, 1999

Related U.S. Application Data

(63) Continuation-in-part of application No. 08/955,338, filed on Oct. 21, 1997.

(51) Int. Cl.[7] .................................................. H04Q 7/20
(52) U.S. Cl. ..................... 455/563; 455/557; 455/412; 379/88.01; 379/88.02; 379/88.03; 379/88.04
(58) Field of Search ................................. 455/563, 557, 455/412; 379/88.01, 88.02, 88.03, 88.04

(56) References Cited

U.S. PATENT DOCUMENTS

| | | | |
|---|---|---|---|
| 3,688,126 | * 8/1972 | Klein | 307/116 |
| 4,320,256 | 3/1982 | Freeman . | |
| 4,475,189 | 10/1984 | Herr et al. . | |
| 4,611,094 | 9/1986 | Asmuth et al. . | |
| 4,731,811 | 3/1988 | Dubus . | |
| 4,829,514 | 5/1989 | Frimmel, Jr. et al. . | |
| 4,856,066 | 8/1989 | Lemelson . | |
| 4,870,686 | 9/1989 | Gerson et al. . | |
| 4,879,744 | 11/1989 | Tasaki et al. . | |
| 4,969,180 | 11/1990 | Watterson et al. . | |
| 5,195,090 | 3/1993 | Bolliger et al. . | |
| 5,222,121 | 6/1993 | Shimada . | |
| 5,274,695 | 12/1993 | Green . | |
| 5,297,183 | 3/1994 | Bareis et al. . | |
| 5,297,194 | 3/1994 | Hunt et al. . | |
| 5,353,335 | 10/1994 | D'Urso et al. . | |
| 5,353,336 | * 10/1994 | Hou et al. | 379/67 |
| 5,377,256 | 12/1994 | Franklin et al. . | |
| 5,420,912 | 5/1995 | Kopp et al. . | |
| 5,440,620 | 8/1995 | Slusky . | |
| 5,450,479 | 9/1995 | Alesio et al. . | |
| 5,509,060 | 4/1996 | Hall et al. . | |
| 5,541,977 | 7/1996 | Hodges et al. . | |
| 5,574,771 | 11/1996 | Driessen et al. | 379/57 |
| 5,602,900 | 2/1997 | Hattori . | |
| 5,659,597 | 8/1997 | Bareis et al. . | |
| 5,710,813 | 1/1998 | Terui et al. . | |
| 5,778,313 | 7/1998 | Fougnies . | |
| 5,790,636 | 8/1998 | Marshall . | |
| 5,797,101 | 8/1998 | Osmani et al. . | |
| 5,802,466 | 9/1998 | Gallant et al. . | |
| 5,812,945 | 9/1998 | Hansen et al. . | |
| 5,826,185 | 10/1998 | Wise et al. . | |
| 5,828,738 | 10/1998 | Spaeth . | |
| 5,832,371 | 11/1998 | Thornton . | |
| 5,835,570 | 11/1998 | Wattenbarger . | |
| 5,850,599 | 12/1998 | Seiderman . | |
| 5,854,975 | 12/1998 | Fougnies et al. . | |
| 5,867,796 | 2/1999 | Inutsuka . | |
| 5,884,188 | 3/1999 | Hayes, Jr. . | |
| 6,049,710 | 4/2000 | Nilsson . | |
| 6,138,036 | * 10/2000 | O'Cinneide | 455/557 |
| 6,149,353 | 11/2000 | Nilsson . | |
| 6,157,848 | * 12/2000 | Bareis et al. | 455/563 |
| 6,167,118 | * 12/2000 | Slivensky | 379/88.03 |
| 6,167,251 | * 12/2000 | Segal et al. | 455/406 |

* cited by examiner

*Primary Examiner*—Daniel Hunter
*Assistant Examiner*—Alan T. Gantt

(57) ABSTRACT

A wireless telephone system incorporates voice activated mobile instruments that are powered through a separate pod that includes electrical couplings either to A.C. structural power or D.C. vehicular power. Furthermore, the system accommodates both digital (DTMF) and voice (audio) communication from the keyless mobile instruments to and through a switched telephone network.

16 Claims, 3 Drawing Sheets

WIRELESS MOBILE TELEPHONE SYSTEM WITH VOICE-DIALING TELEPHONE INSTRUMENTS AND DTMF CAPABILITY

RELATED APPLICATION INFORMATION

This is a continuation-in-part of application Ser. No. 08/955,338, filed Oct. 21, 1997.

BACKGROUND OF THE INVENTION

(1) Field of Invention

The present invention relates to wireless mobile telephone systems incorporating telephone instruments that are capable of being simple in form, e.g. keyless and battery-less, relatively inexpensive and conveniently available for flexible use, both for conversational and DTMF communication.

(2) Background Description

In recent years, wireless mobile telephones have come into extensive and widespread use supported by various forms of central equipment. Generally, wireless telephone instruments, sometimes called "mobile stations" (MS) may be accommodated for example by geographically defined cells. Such systems afford the capability for wireless telephone instruments to communicate with other telephone terminals through the public telephone network while physically roving between locations.

Typically, in mobile wireless systems, individual wireless telephone instruments communicate at an initial level with central equipment, sometimes called "base stations" (BS). Operating with other components in a composite system, the geographically-spaced base stations enable mobile telephone instruments to roam through various geographic areas or cells. Thus, from various locations a mobile telephone instrument can communicate with virtually any telephone terminal throughout the entire dial-up telephone network, sometimes called the "public switched telephone network" (PSTN). Systems may also include a unit called a "mobile switching center" (MSC) for accommodating communication through the PSTN. Accordingly, through wireless mobile telephone communication can be quite effective, a need continues to exist for further convenience and flexibility in the use of mobile telephone instruments.

In the interests of simplicity and economy, it has been proposed to provide voice activated wireless telephone systems using instruments without a numerical keypad, that is, keyless instruments. Essentially, voice-dialing for such instruments is accommodated by voice recognition of spoken numerals to accomplish DTMF signals (dual tone multi frequency) for continual dialing operations. For example, see a co-pending U.S. patent application entitled: WIRELESS PREPAID TELEPHONE SYSTEM FOR PROGRAMMED AND EXPANDED USE, Ser. No. 09/226,178, filed Jan. 4, 1999 which is a continuation in part of an application entitled WIRELESS PREPAID TELEPHONE SYSTEM WITH EXTENDED CAPABILITY, Ser. No. 08/955,338, filed Oct. 21, 1997, which is a continuation in part of an application entitled WIRELESS PREPAID TELEPHONE SYSTEM WITH DISPENSABLE INSTRUMENTS, Ser. No. 08/878,864, filed Jun. 19, 1997, all incorporated by reference herein. Such systems convert audio signals from a telephone instrument that are representative of spoken numerals to DTMF signals for dial up connection to another terminal for vocal communication. However greater flexibility may be desirable in that regard.

In another regard, a weak link in mobile telephone communications involves power for the telephone instrument, e.g., the battery. Essentially, the user of a mobile telephone instrument must always be concerned with the state of the instrument's battery. If an instrument is not used for a time, concern grows for the charge state of the battery. Furthermore, for some batteries, certain charging patterns may be detrimental to the battery power cycle. For example, to maintain an effective power cycle of a battery, it may be important to fully discharge the battery before recharging. Accordingly, maintaining a mobile telephone battery charged for operation sometimes is inconvenient. Essentially without careful planning, a mobile instrument user may be faced with a discharged battery when the need for the instrument is most urgent.

As a related consideration, it is noteworthy that the power pack or battery of a mobile telephone instrument typically accounts for a considerable portion of the instrument's weight, cost and volume. Thus, the battery of a mobile telephone instrument not only presents a limitation on the use of such instruments but also imposes constraints on the design of such instruments.

In view of the above considerations, it may be appreciated that a need exists for mobile telephone instruments which avoid the use of a battery. Additionally, as indicated, a need exists for greater convenience and flexibility with regard to keyless mobile instruments, specifically confirming digital communication and affording communication at any time by either conversational speech (voice) or by DTMF signals (digital). That is, a need exists for a system incorporating mobile instruments that are capable of using voice selectively to communicate either conversationally by speech or digitally by DTMF tones (0–9 etc.).

SUMMARY OF THE INVENTION

To some extent, aspects of the present invention are based on recognizing certain distinct features of wireless mobile telephone systems. For example, the very nature of mobile systems renders the individual telephone instruments: more susceptible to loss or misplacement, more susceptible to misuse, more likely to be individually used (by only a single person), more likely to be unused for long intervals of time, more likely to be intended for emergency or urgent use, more likely to be intended for use in unconventional locations and so on.

Generally, in accordance with one aspect of the present development, in lieu of a battery, wireless telephone instruments are provided with a flexible and convenient power adapter for use with alternative power sources, e.g. automotive power (vehicular) or AC power as available in most buildings (structural). Also, instruments as disclosed herein are simplified by eliminating the keypad and utilizing voice dialing. Voice recognition apparatus in the system central equipment facilitates voice dialing and additionally enables digital communication. A controlled switching capability is provided in the central system to selectively enable communication from the instruments to, or through the public switched telephone network either in a conversational mode (speech) or a DTMF mode (data). Accordingly, in the disclosed embodiment, effective telephonic communication is possible with other telephone terminals from an economical, convenient and compact wireless telephone instrument using either traditional conversation or DTMF signals, (as for a computer telephone interface—CTI). Also, voice dialing (and digital data input) is supplemental by confirmation of individual digits as transmitted.

BRIEF DESCRIPTION OF THE DRAWINGS

In the drawings, which constitute part of this specification, an exemplary embodiment of the invention is set forth as follows.

DESCRIPTION OF THE PREFERRED EMBODIMENT

As indicated above, a detailed embodiment of the present invention is disclosed herein. However, the embodiment is merely representative, recognizing that a wide variety of alternative embodiments are possible utilizing a multitude of different techniques and components variously distributed and located. Nevertheless, the disclosed embodiment is deemed to afford the best embodiment for purposes of disclosure and to provide a basis for the claims herein which define the scope of the present invention.

Figure 1:
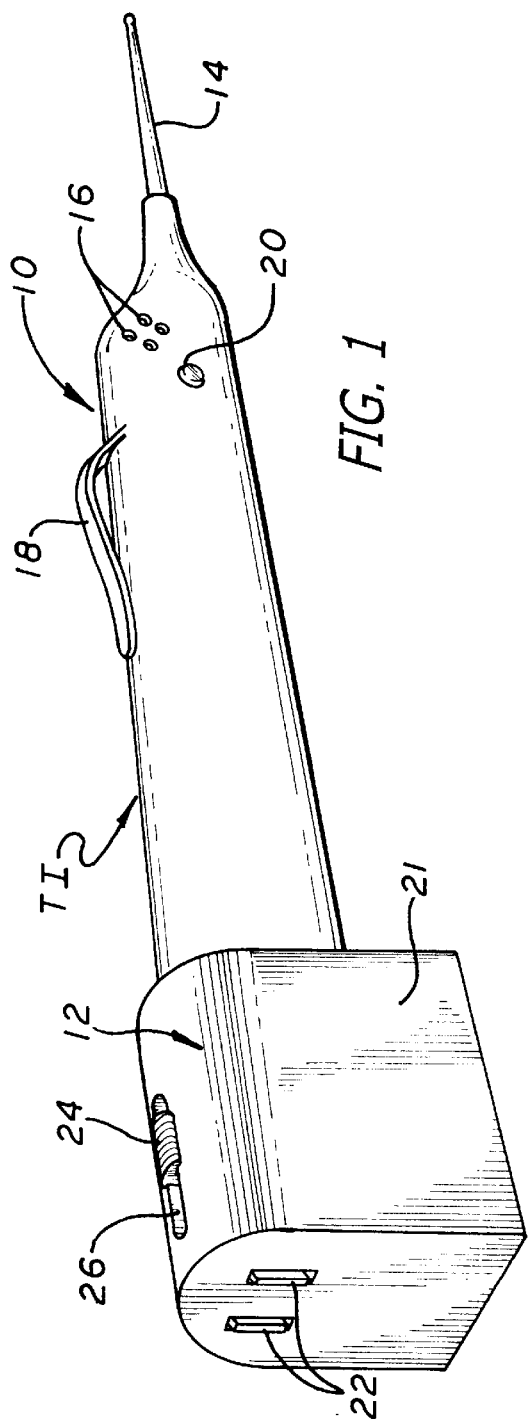
FIG. 1 is perspective view showing a wireless telephone instrument in accordance with the present invention and for use in a system in accordance with the present invention.

Referring initially to FIG. 1, a mobile station or wireless telephone unit or instrument TI is depicted showing some of the external components. Specifically, the instrument TI includes an elongate tubular hand piece 10 (housing) shown matingly engaged with a power pod unit 12. Essentially, the hand piece 10 is telescopically engaged (frictionally) with the pod unit 12 when the instrument TI is not in use. When in use, the pod unit 12 is separated from the hand piece 10 and coupled to a power source (for example, either conventional "110 V," AC power or low voltage D.C. power, e.g., automotive). As disclosed in detail below, a cable (treated below) is provided from the pod unit 12 (when engaged to a power connection) supplying appropriate power to the handpiece 10 while allowing the connected handpiece 10 to be positioned near a user's face.

Considering the instrument TI in greater detail as shown in FIG. 1, an antenna 14 is fixed at the end (right) of the hand piece 10. Near the antenna 14, perforations 16 in the hand piece 10 pass sound to the user's ear. At locations near the perforations 16, a pocket clip 18 and a pilot lamp 20 are provided.

As the instrument TI is shown in FIG. 1, other external components of the hand piece 10 are obscured by the power pod 12. However, note that the pod unit 12 includes a block 21, somewhat in the shape of a semi cylinder, extended at its plane surface, and which contains prongs or bayonet contact elements 22 of an AC plug shown withdrawn or recessed in the pod unit 12. The contact elements 22 are carried on a frame (not shown in FIG. 1) which incorporates a slide button 24 fixed in an elongated opening 26 that extends parallel to the cylindrical axis. Accordingly, moving the slide button 24 away from the hand piece 10 positions the contact elements 22 out of the pod unit 12 for engagement with a conventional AC receptacle. Alternatively, as disclosed in detail below, the pod unit 12 may engage the traditional "cigarette lighter" coupling in widespread automotive use to provide DC power.

Figure 2:
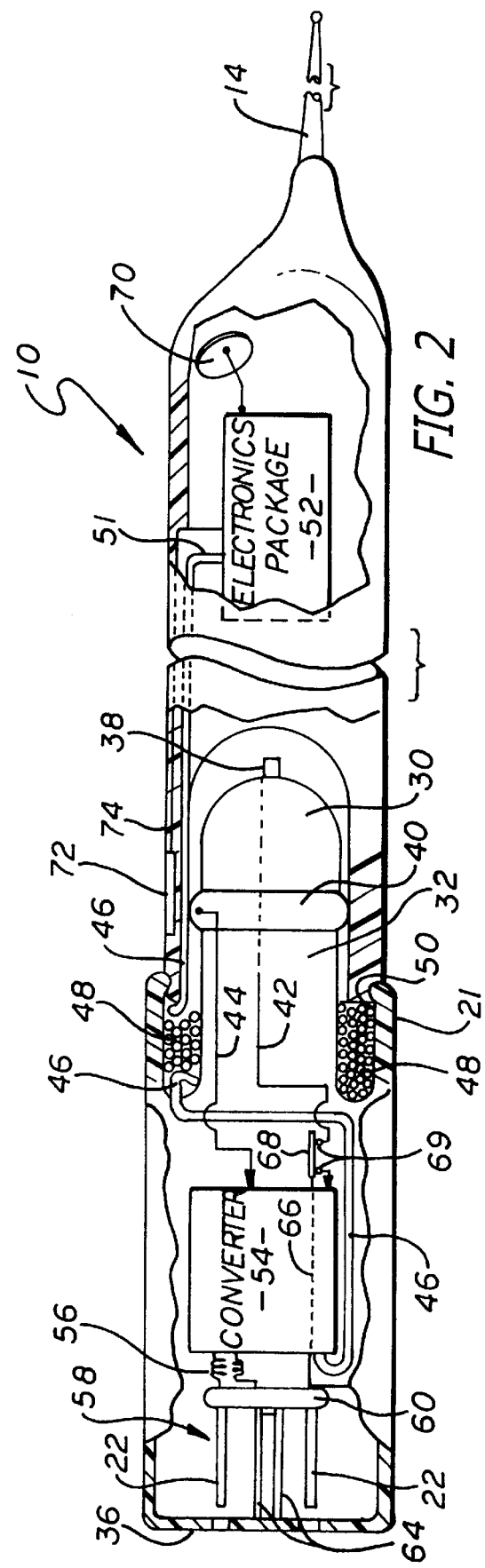
FIG. 2 is a sectional view taken lengthwise through the instrument of FIG. 1.

Considering the instrument TI in greater detail, reference will now be made to FIG. 2. Somewhat at the center of FIG. 2, a hemispherical distal end 30 of the pod unit 12 is shaped hemispherically for male engagement with a conventional automotive power outlet (cigarette lighter receptacle—not shown). The distal end 30 is integral with a cylindrical portion 32 of the pod 12 and the block 21. Essentially, the distal end 30 of the pod unit 12 accommodates DC coupling while the opposed end 36 accommodates an AC coupling. Generally, the block 21 and integral structure of the pod unit 12 may be formed of plastic non conductive material.

Considering the pod unit 12 in greater detail, as illustrated, when not in use, the end 30 (right) is matingly received in the hand piece 10. The domed hemisphere is terminated by a concentric metallic contact 38. Thus, the contact 38 provides one DC power connection, while a second connection is provided by an annular band contact 40, concentrically mounted on the cylinder portion 32. Accordingly, insertion of the distal end 30 and the cylindrical portion 32 into an energized automotive receptacle provides direct current (DC) power.

The electrical connection provided by the contacts 38 and 40 is through wires 42 and 44 which are coupled to a converter 54 from which a cable pair 46 emerges and are wrapped to form a coil 48 when the instrument TI is not in use. Note that the coil 48 dwells in an annular space 50 defined between the hand piece 10 and the block 21 when the two are matingly engaged. The opposed end 51 of the cable 46 is electrically connected to power an electronics package 52 mounted in the tubular hand piece 10.

Returning to the electrical structure of the pod unit 12 for further consideration, connectors or wires 42 and 44 are coupled to the converter 54 which alternatively may be connected to a source of alternating current (AC) power through expansion wires 56 and a plug structure 58. The plug structure 58 incorporates a yoke 60 of insulating material which supports the AC contact elements 22 that are electrically connected to the wires 56. The yoke 60 is supported on rails 64 allowing it to move axially with respect to the pod unit 12 so as to extend the prongs or contact elements 22 for electrical engagement with a conventional AC receptacle. Thus, either the prongs 22 or the contacts 38 and 40 may engage mating connections (not shown) to a source of power. Accordingly, the power converter 54 is energized to power the electronics package 52 with appropriate electrical energy.

The power pod unit 12 may be disengaged from the hand piece 10, simply by force to engage an electrical power connection through the cable 46 (e.g. vehicular or structural), allowing freedom of movement for the hand piece 10. Thus, energized, the power converter 54 receives either AC power (prongs 62 and wires 56) or DC power (contact 38 and band 40) functioning to provide the appropriate power for the electronics package 52. When so powered, the lamp 20 (FIG. 1) is energized. Note that when the instrument TI is not in use, the cable 46 is simply wrapped about the cylindrical portion 32 and concentrated as the coil 48 in an annular space defined between the pod 12 and the hand piece 10.

The hand piece 10 functions as a housing for the electronics package 52 along with other transceiver elements including an earphone 70 (FIG. 1, under the perforations 16). Additionally, the hand piece 10 carries a microphone 72, which is also connected to the electronics package 52 and which is fixed in a cylindrical wall 74 of the hand piece 10.

In view of the above description, it will be apparent that a particularly economical and practical telephone instrument TI may be provided in accordance herewith without many of the problems sometimes occurring in the use of such units. Generally, the individual instrument TI would be one of a multitude capable of interfacing wireless central station apparatus for connection to another telephonic terminal through the public switched telephone network. The connection would be accomplished through central equipment (interfacing the public switched telephone network) by the user of the instrument TI speaking the numbers of a called telephone terminal. With the established connection through a switched telephone network, normal voice communication could proceed. However, the situation sometimes arises when, after communication is established with another terminal, it is desirable to communicate from the wireless instrument, e.g. the instrument TI, using DTMF or other forms of non-vocal signals. That is, in many situations, it is desirable to communicate (as with a computer) from a telephone instrument, providing digital information with Touch-Tone signals, e.g. DTMF (dual-tone multiple frequency). In accordance herewith, such communication is accommodated as will now be explained.

Figure 3:
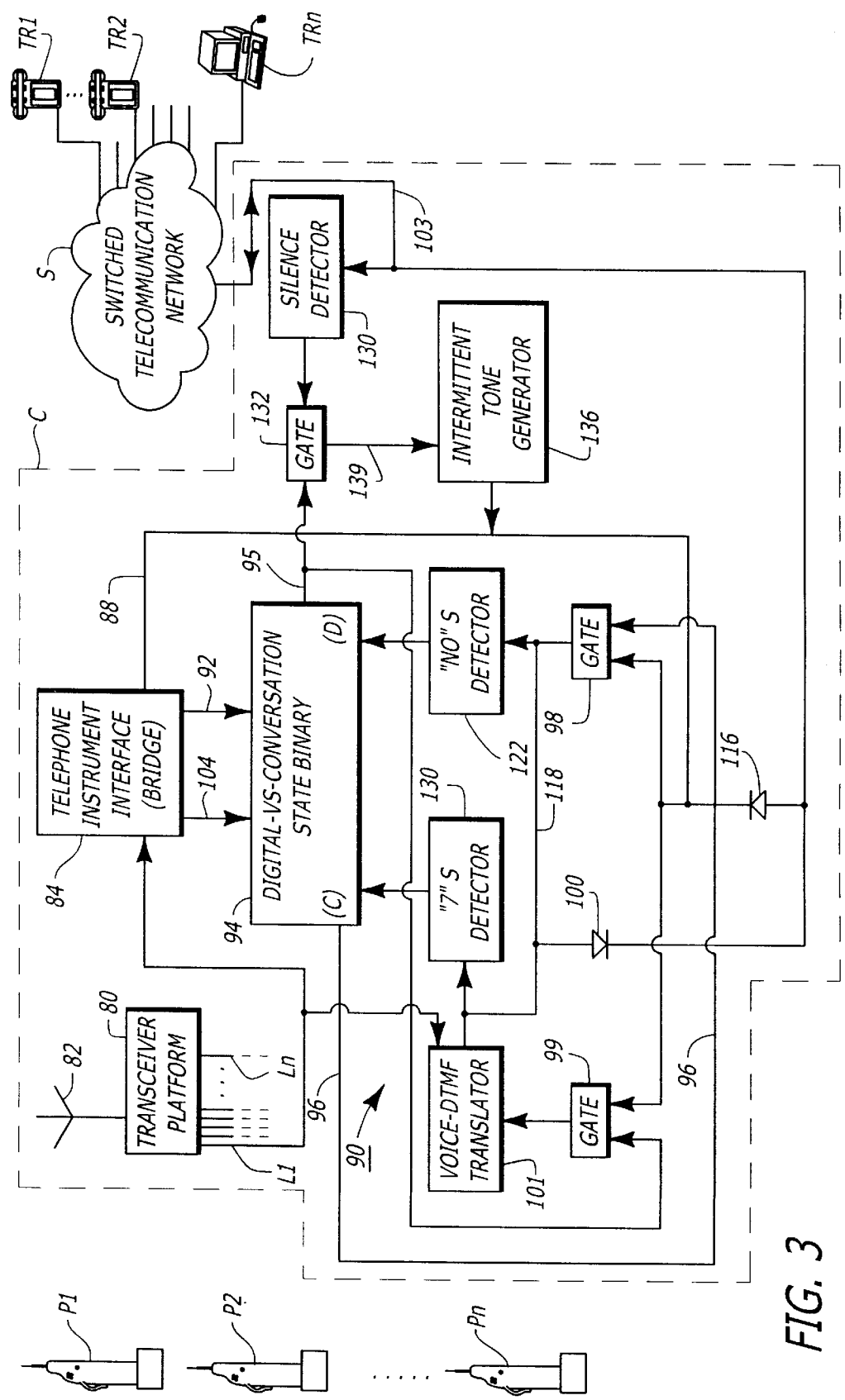
FIG. 3 is block diagram of a system in accordance with the present invention showing plural telephone instruments and central station components for use with a public switched telephone network.

In FIG. 3, a multitude of wireless mobile telephone instruments P1–Pn are represented (left). Essentially, the instruments P1–PN interface a central wireless system C to accomplish telephonic connection through a switched telecommunications network S with any of a plurality of other telephonic terminals generally indicated as remote terminals TR1–TRn. As illustrated, the other terminals TR1–TRn may include computers and the like. Somewhat summarily, the communication operation involves a caller using one of the terminals P1–Pn to interface the central system C for the entry of spoken numerals representative of a called number. In the disclosed embodiment at the outset, the system C converts or translates the spoken numerals to DTMF signals and accordingly actuates the network S to establish a telephonic communication between the calling terminal, e.g. P1 and a called number, e.g. terminal TR1. Thereafter, in accordance herewith, the wireless instrument P1 may communicate with the called terminal TR1, using either voice communication or digital (DTMF) communication. Consequently, the caller, for example at the instrument P1, can effectively interface a computer, as to obtain information, participate in a collective activity, accomplish any of a multitude of transactions and so on. Thus, through various paths, the voice-actuated wireless instruments P1–Pn are capable of effective computer telephonic interface (CTI).

Considering the system of FIG. 3 in greater detail, the individual wireless instruments P1–Pn communicate through radio links with a transceiver platform 80 as illustrated. In that regard, the platform incorporates antenna structure 82 to facilitate individual radio links and is capable of simultaneously accommodating many individual instruments from the group of instruments P1–Pn. That is, the central wireless system C includes the capability to concurrently process and accommodate communication from an active plurality of the instruments P1–Pn simultaneously through a large number of individual lines L1 through Ln. The platform 80 may also include some processing or voice capability. As the platform 80 and other elements of the central wireless system C are provided, the various capabilities may shift from one element to another. Related to that consideration, note that in the detailed system of FIG. 3, a single block diagram is shown to accommodate one line L1 of many lines L1–Ln. Of course, all of the lines L1–Ln are to be accommodated; however, several alternatives exist to simply replicating the implementation blocks of FIG. 3. Specifically, reference is to such techniques and structures as multiplexing and so on. Thus, the capability illustratively coupled to the line L1 is afforded for each of the other lines as by multiplexing, parallel operation and so on.

The line L1 is coupled to a telephone instrument interface or bridge 84 which serves to obtain the called telephone number and to indirectly provide appropriate dialing signals to the switched telecommunication network S to accomplish the desired connection. As indicated above, such dialing signals may for example take the form of Touch-Tone signals or DTMF signals.

A form of apparatus suitable for use as the bridge 84 is described in detail in the above-referenced patent applications incorporated by reference herein. For example, the bridge 84 may incorporate an audio response unit for prompting callers to speak called telephone numbers, along with voice decoder apparatus for translating spoken called numbers into keypad signals, e.g. DTMF, which are provided to the network S. Upon accomplishing a desired connection, the bridge 84 simply couples the calling instrument to the established connection through the network S.

In view of the above preliminary explanations in the system of FIG. 3, a comprehensive understanding thereof may now be accomplished by considering a sequence of operations and explaining additional elements along with their function. Accordingly, assume a user at the wireless instrument P1 who desires to establish telephonic contact with the terminal TRn (a computer). At the outset, the user separates the hand piece 10 (FIGS. 1 and 2) from the pod 12, inserts the pod into a power receptacle (AC or DC) thereby providing power to the electronics package 51. Thus, the pilot lamp 20 is energized and an introductory signal is provided from the instrument P1 to the transceiver platform 80 (FIG. 3). As a consequence, the platform 80 actuates the telephone instrument interface or bridge 84 which controls the process to sequence the connection operation. Specifically, the bridge 84 prompts the user to provide the called telephone number, receives the number (vocal signals) acknowledges receipt of the number and provides a signal in a line 92 to reset a binary 94. Depending on the state of the binary 94, communication is either keypad (digital) or voice. Accordingly, the output of the binary is high in one of the lines 95 or 96.

Considering these operational steps in greater detail, note that they may be variously allocated between the platform 80 and the interface 84 depending on equipment selections and implementations. To prompt the user, a dial tone or other signal may be transmitted to the instrument P1. As the caller (at the instrument P1) speaks each decimal digit, an acknowledgment signal is provided. That is, the spoken numerals (digits) of the called number are represented by received audio signals passed from the bridge 84 through the line 88 to a gate 99 which is qualified by the high binary signal in the line 95 and accordingly passes the voice signals to a voice-DTMF detector or translator 101. Next, individual DTMF signals (or other keypad signals) are passed from the translator 101 back to the platform 80 and then transmitted back to the instrument P1 to acknowledge the digits. Additionally, the translated digit signal (e.g. DTMF) is passed through a diode 100 and the line 103 to the network S to accomplish a dial up connection.

With completion of the dialing, the bridge 84 senses the dial up connection through a diode 116 and provides a high binary signal in a line 104 to set the binary 94 for vocal (conversation) communication. Specifically, with the gate 98 qualified, the operation is to pass audio signals representative of voice. That is, the operation after establishing a connection from calling terminal P1 to called terminal TRn is to set the vocal state with the binary 94 set. Such a mode of operation is referred to as the "conversation state." Note that with a conversation state established between the instrument P1, and a telephone terminal, TR1, network no longer responds to DTMF signals. That is, the network S is no longer responsive to dialing signals as in a DTMF form. Consequently, if voice communication were the caller's objective, such could be pursued at the present stage. Note that the logic circuit 90 monitors the operation for commands by the caller to initiate digital communication.

In the conversation state, audio from the instrument P1 passes through: the line L1, the bridge 84, the line 88, the gate 98, the diode 100 and the line 103 to the network S. Similar signals from the network S (terminal TRn) pass through: the line 103, the diode 116, the line 88 and the bridge 84 to the L1.

Figure 4:
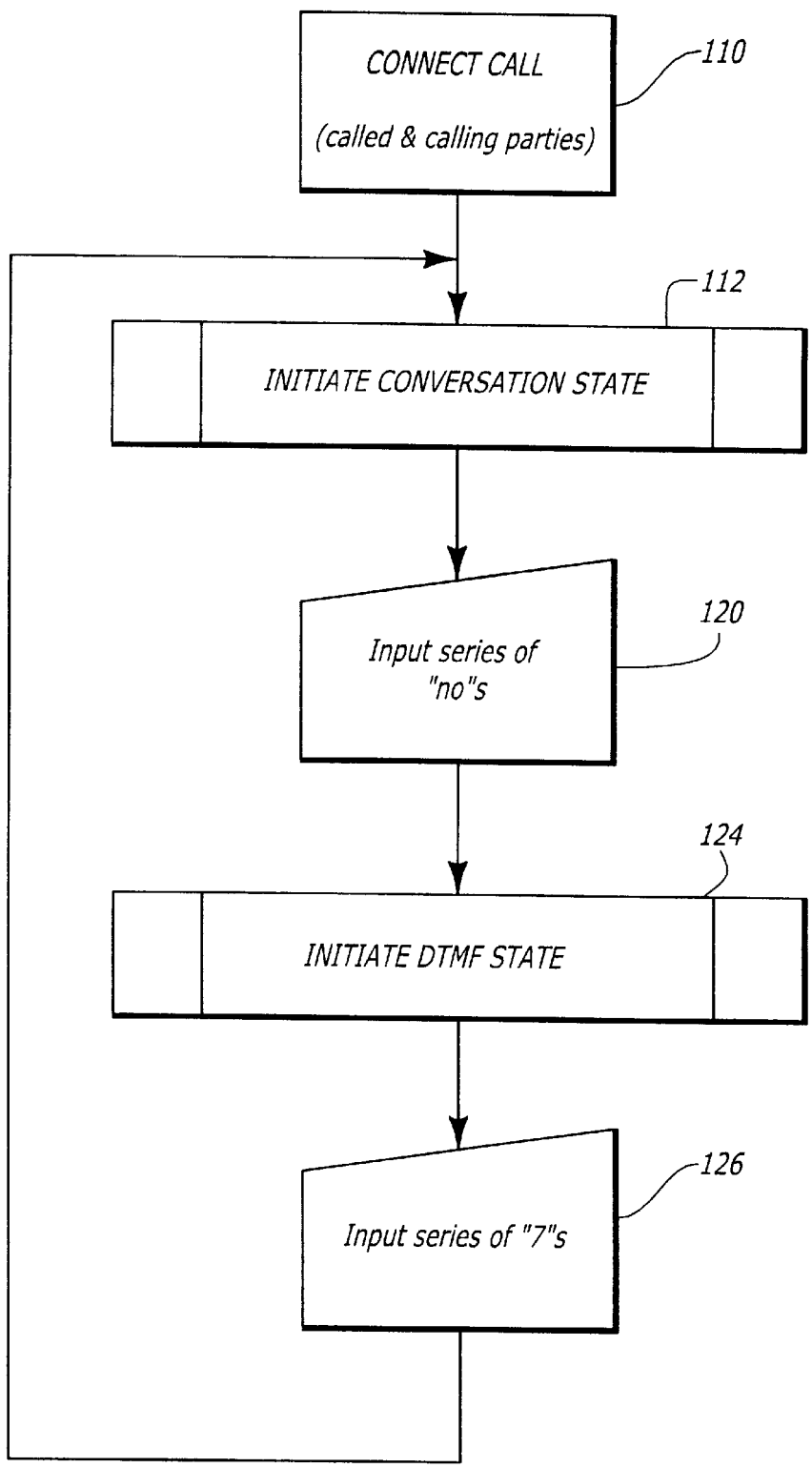
FIG. 4 is a flow chart detailing certain operations of the system of FIG. 3.

Recapitulating, the operation of the system of FIG. 3 is illustrated by a flow diagram in FIG. 4. Specifically, a block 110 represents the process step of connecting the called and calling terminals as explained above. Thereafter, a block 112 indicates the predefined process step of initiating a conversational state, establishing a vocal path for the communication link through the gate 98 (FIG. 3) as explained above. If however, the digital or DTMF state is desired, the binary 94 must be reset to establish a data path.

To accommodate digital communication, for example between the instrument P1 and the computer terminal TRn, the operating mode or state is altered to digital by the caller giving a command signal. The change of state is accomplished by the user at the instrument P1 speaking a series of words, e.g. "no" in rapid succession. In FIG. 4, the manual input operation is represented by a block 120. In the system of FIG. 3, the spoken series of the word "no" is detected by a detector 122 (center right) to provide a pulse or binary high signal to reset the binary 94. As a result, the DTMF or digital state is represented by a block 124 in FIG. 4. The operation of the system in the system in the digital state to accommodate communication with keypad signals, for example DTMF signals will now be considered.

Recapitulating, in the digital state, the gate 98 is "closed" and the gate 99 is "open"; both under control of the binary 94. Thus, the gates 98 and 99 serve as switches to route the communication signals as desired. To consider the operation, assume that the computer TRn produces voice signals for cuing the caller at the instrument P1. For example, the voice signals might take the form: "Please enter your social security number." Audio signals representative of such a cue would pass through the network S, the line 103, the diode 116, the line 88, the bridge 84 and be transmitted by the platform 82 to the instrument P1. Responsive to the cue, assume the system is in the digital state and the caller speaks the individual social security numerals, e.g. "529-20-4731." The spoken digit words are received by the platform 80, passed through the bridge 84 and the gate 99 to the voice translator 101. In the disclosed embodiment, utilizing known technology, the translator 101 sequentially translates or converts the spoken numerals to representative DTMF signals. The represented numerals are acknowledged to the caller and DTMF signals representative of the social security number (529-20-4731) are provided through the diode 100, the line 103 and the network S to the computer TRn. Accordingly, a digital interface communication is accomplished in accordance herewith.

In a typical interface, further voice-digital exchanges would occur, the caller being prompted by spoken words (audio) and replying digitally as a result of the system converting spoken numerals to a digital form (DTMF). Consequently, a computer telephonic interface is accomplished as to enable any of a multitude of transactions or other exchanges.

At some point during the digital state, it may be desirable to return to the conversational voice state. To accomplish the change in the illustrative system of FIG. 3, the caller gives a command signal, herein speaks a series of words indicating the numeral "seven." The detailed operation of accomplishing the switch or change of state will now be considered.

With the occurrence of spoken words indicating "seven," a "7"s detector 130 senses the series of seven's and sets the binary 94. That is, the binary 94 is set in a state to provide a high signal level in the line 96. Accordingly, the gate 99 is "closed" and the gate 98 is "opened" returning the system to the audio or voice state. The operation is graphically represented in FIG. 4 by the block 126. Of course, the caller may repeatedly switch between the two operating states. Also, it is to be recognized that any of a variety of sensors may be employed in combination with specific program instructions to switch a change in state. Although computer telephonic interface operations frequently involve calls placed from a telephone instrument as the instrument P1 to a computer, as the computer TRn, it is noteworthy that systems in accordance herewith may accommodate calls originating at the computer. In that regard, note that calls originated by the computer TRn actuate a connection through the network S, the line 103, the diode 116 and the line 88 to the bridge 84. Consequently, the bridge 84 utilizes known mobile telephone technology to complete the call to a wireless unit, e.g. the instrument P1.

In the operation of the system of FIG. 3, it may be desirable to provide some form of signal indicating the current state of the system. In accordance with the system of FIG. 3, the voice or conversation state is conventional in that no signaling occurs. However, in the digital state, a form of a state signal is provided to the user, for example the person using the instrument P1. Of course, any of a variety of signals could be utilized to manifest the digital state. However, in the illustrative embodiment, during intervals of silence, a simple low-frequency intermittent tone is provided. Consider the structure.

A silence or null detector 130 is connected to the line 103 to provide a high-level binary signal at a time when the line is null (carries no signals) the null-indicating signal is provided to a gate 132 which is also connected to receive the reset signal (digital state) from the binary 94. Accordingly, during the digital state, the gate 132 is qualified to provide a high output through a line 139 to an intermittent tone generator 136. Essentially, the generator 136 is simply keyed by the received signal to provide an intermittent low-frequency tone to the line 88. Consequently, when the system is in the keypad or digital state, during periods of silence, a low-frequency tone is provided through the bridge 84 to the platform 80 for transmission to the caller at the instrument P1. Thus, the digital state is manifest as a convenient reminder to the caller.

In view of the above, it will be clear that an effective, convenient and inexpensive wireless telephone instrument may be provided for use in association with any of a variety of different systems. Furthermore, in accordance herewith, such mobile units are accommodated with the ability to communicate either conversationally or digitally, as by using keypad signals. In that regard, it would be apparent that other embodiments and processes may be employed, utilizing the developments hereof. While a preferred embodiment has been described and illustrated, various substitutions and modifications may be made thereto without departing from the scope of the invention. Thus, it is to be understood that the present invention has been described by way of illustration and not limitation. Accordingly, the proper scope hereof is deemed appropriately determined on the basis of the claims as set forth below.

What is claimed is:

1. A wireless telephone system for use with a plurality of mobile telephone instruments operated by voice dialing and using voice communication to communicate through a switched telephone network with other telephone terminals comprising:

a platform for interfacing the plurality of mobile telephone instruments to receive voice signal representations originating from individual mobile telephone instruments;

a voice translator for converting signals representative of spoken numerals to keypad representations of the spoken numerals;

a control unit for alternately indicating a state for either keypad or vocal communication for the individual telephone instruments;

a switching structure controlled by the control unit for alternately routing voice signal representations originating from individual mobile telephone instruments to the switched telephone network untranslated or through the voice translator for communication; and a detector coupled to the platform for detecting specific voice signal representations from the mobile telephone units to control the control unit whereby a mobile telephone unit may communicate through the switched telephone network in either voice or keypad signals using speech.

2. A wireless telephone system according to claim 1 wherein said specific voice representations consist of voice representative audio signals.

3. A wireless telephone system according to claim 1 further including a signal source for providing a state signal to said individual telephone units manifesting the existing state for communication.

4. A wireless telephone system according to claim 1 further including a state signal source to manifest the keypad communication state at mobile telephone units.

5. A wireless telephone system for accommodating a plurality of voice-activated wireless telephone instruments to communicate through a switched telephone network with communicating telephone terminals by either vocal conversation or keypad signals, comprising:

a wireless transceiver platform for communicating with the voice-actuated wireless telephone instruments;

a telephone interface coupled to the wireless transceiver platform for bridging wireless telephone instruments to communicate through the switched telephone network to selected of the other telephone terminals;

a voice path coupled to the telephone interface for passing vocal conversation signals from a communicating voice-actuated wireless telephone instrument to a selected telephone terminal;

a data path coupled to the telephone interface including a voice recognition unit for translating vocalized numeral signals from a communicating voice-actuated wireless telephone instrument to keypad signals and passing the keypad signals to the selected telephone terminal; and a control switch actuated from the communicating voice-actuated wireless telephone instrument for alternatively selectively coupling the vocal path and data path for communication to the selected telephone terminal.

6. A platform system for interfacing a plurality of wireless mobile telephone units to receive voice signal representations for either voice or digital communication, comprising:

a voice translator for converting signals from the wireless mobile telephone units representative of spoken numerals to keypad representations of the spoken numerals;

a control unit for alternatively indicating a state for either keypad or vocal communication for the individual telephone units;

a switching structure controlled by the control unit for alternatively routing signals from individual mobile telephone units to the switched telephone network untranslated or through the voice translator; and a detector for detecting specific signals from the mobile telephone units to control the control unit whereby a wireless mobile telephone unit may selectively communicate in either conversation or keypad communication using speech.

7. A method of interfacing a plurality of wireless mobile telephone instruments to receive voice signal representations for either voice or digital communication through a switched telephone network, comprising the steps of:

storing a current operating state to indicate alternatively, conversation or keypad communication for an active unit of the wireless mobile telephone instruments;

receiving audio signals from the active units of said wireless mobile telephone instruments to indicate spoken words including words manifesting numerals;

for the active units of the wireless mobile telephone instruments that are in the keypad communication state, translating words manifesting numerals to keypad representations thereof for communication to the switched telephone network;

for the active units of the wireless mobile telephone instruments that are in a conversation communication state, passing audio signals to the switched telephone network unconverted; and receiving specific audio signals from the active units of said wireless mobile telephone instruments to alter the current operating state.

8. A method according to claim 7 further including the steps of manifesting the current keypad state to the active of said wireless mobile telephone instruments.

9. A wireless telephone system according to claim 1 further including a state signal structure for providing a signal to mobile telephone instruments selectively during periods of silence to manifest the existing state for communication.

10. A wireless telephone system according to claim 9 wherein said state signal structure manifests the keypad state of communication for a mobile telephone instrument.

11. A wireless telephone system according to claim 5 wherein said control switch is actuated from the communicating voice-actuated wireless telephone instrument by spoken words.

12. A wireless telephone system according to claim 5 including a signal unit for manifesting the state of the control switch at the communicating voice-actuated wireless telephone instrument.

13. A platform system according to claim 6 wherein said detector detects specific signals representing a series of a repeated word as spoken at a wireless mobile telephone unit.

14. A platform system according to claim 6 including a signal unit for manifesting the state of the switching structure at individual mobile telephone units.

15. A platform system according to claim 6 wherein the switching structure couples the keypad representations from the voice translator to the individual telephone units as acknowledgements.

16. A method according to claim 7 further including a step of providing signal indications of keypad representations to active wireless mobile telephone instruments to acknowledge translated words.

* * * * *